(12) United States Patent
Schwerdtner et al.

(10) Patent No.: US 8,368,743 B2
(45) Date of Patent: Feb. 5, 2013

(54) INTERFACE AND CIRCUIT ARRANGEMENT, IN PARTICULAR FOR HOLOGRAPHIC ENCODING UNITS OR HOLOGRAPHIC REPRODUCTION DEVICES

(75) Inventors: Alexander Schwerdtner, Dresden (DE); Armin Schwerdtner, Dresden (DE)

(73) Assignee: SeeReal Technologies S.A., Munsbach (LU)

( * ) Notice: Subject to any disclaimer, the term of this patent is extended or adjusted under 35 U.S.C. 154(b) by 747 days.

(21) Appl. No.: 12/439,105

(22) PCT Filed: Aug. 31, 2007

(86) PCT No.: PCT/EP2007/059119
§ 371 (c)(1),
(2), (4) Date: Oct. 30, 2009

(87) PCT Pub. No.: WO2008/025842
PCT Pub. Date: Mar. 6, 2008

(65) Prior Publication Data
US 2010/0045776 A1    Feb. 25, 2010

(30) Foreign Application Priority Data

Sep. 1, 2006  (DE) ............... 10 2006 042 323
Sep. 1, 2006  (DE) ............... 10 2006 042 324
Sep. 1, 2006  (DE) ............... 10 2006 042 326
Sep. 1, 2006  (DE) ............... 10 2006 042 613

(51) Int. Cl.
*H04N 5/89* (2006.01)
*H04N 13/00* (2006.01)

(52) U.S. Cl. .................. 348/40; 359/24; 359/204.1

(58) Field of Classification Search .............. None
See application file for complete search history.

(56) References Cited

U.S. PATENT DOCUMENTS

| 4,109,996 | A | 8/1978 | Ersoy |
| 6,525,847 | B2 * | 2/2003 | Popovich et al. ............... 359/15 |
| 6,621,605 | B1 | 9/2003 | Grossetie et al. |
| 2005/0286101 | A1 | 12/2005 | Garner et al. |
| 2006/0139711 | A1 * | 6/2006 | Leister et al. ............... 359/9 |

(Continued)

FOREIGN PATENT DOCUMENTS

| DE | 10 2006 004 300 | 8/2007 |
| WO | WO 02/39194 | 5/2002 |

(Continued)

OTHER PUBLICATIONS

International Search Report, dated Dec. 6, 2007, issued in priority International Application No. PCT/EP2007/059119.

(Continued)

*Primary Examiner* — Ario Etienne
*Assistant Examiner* — Clayton R Williams
(74) *Attorney, Agent, or Firm* — Saul Ewing LLP

(57) ABSTRACT

The invention relates to an interface and circuit arrangement, in particular for transmitting digital image data to at least one holographic encoding unit (HEU), which generates complex hologram values from image data containing depth information and/or encodes the pixel values for controlling at least one light modulator element of a holographic reproduction device. The invention is characterized in that the interface transmits the depth map of the image data and the color map of said image data separately via transmission means (L1, L2) and communication protocols, said depth map comprising the depth information and the color map the color information of scanned images in an image sequence.

12 Claims, 1 Drawing Sheet

U.S. PATENT DOCUMENTS

| | | |
|---|---|---|
| 2006/0187297 A1 | 8/2006 | Onural |
| 2007/0081207 A1* | 4/2007 | Bimber ............................ 359/9 |
| 2010/0002077 A1* | 1/2010 | Viggiano et al. .............. 348/115 |

FOREIGN PATENT DOCUMENTS

| | | |
|---|---|---|
| WO | WO 03/017246 | 2/2003 |
| WO | WO 2004/044659 | 5/2004 |
| WO | WO 2006/027228 | 3/2006 |
| WO | WO 2006/066906 | 6/2006 |
| WO | WO 2006/066919 | 6/2006 |
| WO | WO 2006/119760 | 11/2006 |

OTHER PUBLICATIONS

Lucente, M., "Interactive computation of holograms using a look-up table," J. Electronic Imaging, 2(1), pp. 28-34 (1993).

* cited by examiner

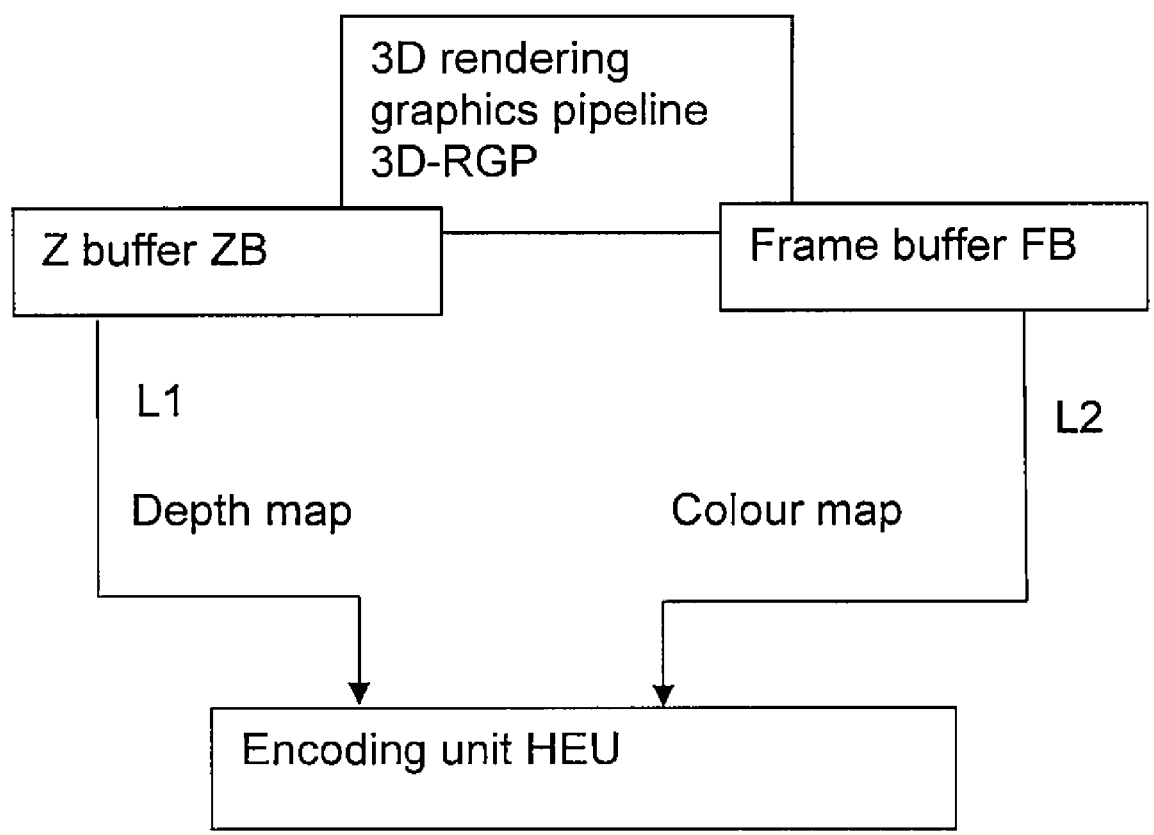

INTERFACE AND CIRCUIT ARRANGEMENT, IN PARTICULAR FOR HOLOGRAPHIC ENCODING UNITS OR HOLOGRAPHIC REPRODUCTION DEVICES

CROSS REFERENCE TO RELATED APPLICATIONS

This application claims the priority of PCT/EP2007/059119, filed on Aug. 31, 2007, which claims priority to DE 10 2006 042613.4, filed Sep. 1, 2006, DE 10 2006 042324.0, filed Sep. 1, 2006, DE 10 2006 042326.7, filed Sep. 1, 2006, and DE 10 2006 042323.2, filed Sep. 1, 2006, the entire contents of which are hereby incorporated in total by reference.

BACKGROUND OF THE INVENTION

The present invention relates to an interface and a circuit arrangement, where digital image data are transmitted to a holographic encoding unit or to a holographic display device which comprises a holographic encoding unit. The image data are generated from video sequences. An encoding unit then generates complex hologram values and/or encodes the pixel values for a holographic display device based on the transmitted data. An encoding unit is for example a dedicated computing unit.

FIELD OF THE INVENTION

In a conventional two-dimensional monitor, rendered image data are transmitted to the monitor through an interface, and the image is represented with the respective pixel values. In contrast to conventional two-dimensional monitors, holographic display devices are characterised in that modulated light which is capable of generating interference propagates in the space in front of the eyes of an observer in the form of a light wave front which is controllable as regards their amplitude and/or phase values, said light wave front thereby reconstructing a three-dimensional scene. Controlling a light modulator means with the hologram values of the video holograms causes the emitted wave field, individual pixels of which having been modulated accordingly, to reconstruct the desired three-dimensional scene by creating interferences in space.

A holographic display device which is preferably used for the present invention is substantially based on the following principle: a scene which is divided into object points is encoded as an entire hologram on at least one light modulator means. The scene can be seen as a reconstruction from a visibility region which lies within one periodicity interval of the reconstruction of the video hologram. A sub-hologram is defined for each object point of the scene to be reconstructed. The entire hologram is formed by a superimposition of sub-holograms. In general, the principle is to reconstruct mainly that wave front that would be emitted by an object into one or multiple visibility regions.

In detail, such a device is based on the principle that the reconstruction of an individual object point only requires a sub-hologram as a subset of the entire hologram encoded on the light modulator means. The holographic display device comprises at least one screen means. The screen means is either the light modulator itself where the hologram of a scene is encoded or an optical element—such as a lens or a mirror—on to which a hologram or wave front of a scene encoded on the light modulator is imaged.

The definition of the screen means and the corresponding principles for the reconstruction of the scene in the visibility region are described in other documents filed by the applicant. In documents WO 2004/044659 and WO 2006/027228, the screen means is the light modulator itself. In document WO 2006/119760, "Projection device and method for holographic reconstruction of scenes", the screen means is an optical element on to which a hologram which is encoded on the light modulator is imaged. In document DE 10 2006 004 300, "Projection device for the holographic reconstruction of scenes", the screen means is an optical element on to which a wave front of the scene encoded on the light modulator is imaged.

A 'visibility region' is a confined region through which the observer can watch the entire reconstructed scene. Within the visibility region, the wave fields interfere to form a wave front such that the reconstructed scene becomes visible for the observer. The visibility region is located on or near the eyes of the observer. The visibility region can be moved in the directions X, Y and Z and is tracked to the actual observer position with the help of known position detection and tracking systems. It is possible to use two visibility regions for each observer, one for each eye. Generally, other embodiments of visibility regions are also possible. It is further possible to encode video holograms such that individual objects or the entire scene seemingly lie behind the light modulator for the observer.

Document WO/2006/066906 filed by the applicant describes a method for computing video holograms. It generally includes the steps of slicing the scene into section planes which are parallel to the plane of a light modulator, transforming all those section planes into a visibility region and to add them up there. Then, the added results are back-transformed into the hologram plane, where also the light modulator is disposed, thus determining the complex hologram values of the video hologram.

Document DE 10 2006 042 324 filed by the applicant describes a method for the real-time generation of video holograms. This method uses the principle that the reconstruction of a single object point only requires a sub-hologram as a subset of the entire hologram which is encoded on the light modulator. It is characterised in that for each object point the contributions of the sub-holograms can be retrieved from at least one look-up table, and that said sub-holograms are superimposed so as to form an entire hologram in order to reconstruct the entire scene.

A multitude of further methods and devices are known in the field of holography, which, however, differ from the above-mentioned principles. For example, document U.S. Pat. No. 4,109,996 A describes a method for generating a synthetic hologram, and document US 2005/0286101 A1 describes a holographic projector.

Document U.S. Pat. No. 6,621,605 B1 describes a computer-aided method and device for restoring three-dimensional images and mentions an interface for transmitting data. The three-dimensional images are sliced into a multitude of two-dimensional sectional images. These data of the two-dimensional sectional images are transmitted together with the colour information to a display device which sequentially represents the two-dimensional images such that the observer seemingly watches a three-dimensional scene. The term 'restoration' shall be interpreted in this sense. A disadvantage is that the two-dimensional data also comprise portions of images which are not visible to the observer. More data than required are thus transmitted. When optimised with regard to the visibility, the amount of data would still be very large or larger than necessary.

Document US 2006/0187297 A1 describes holographic 3D television. A three-dimensional television system captures a 3D motion scene, converts it based on 3D graphic methods, transmits these data and finally converts them into holographic signals using efficient algorithms in order to yield a holographic representation. Said transmitted data include a conversion of the 3D scene into a wire-mesh model. A disadvantage therein is that a much larger amount of data is transmitted than necessary.

SUMMARY OF THE INVENTION

It is the object of the present invention to minimise the amount of data which is transmitted to an encoding unit. In particular when displaying a video sequence, the amount of transmitted data shall be minimal.

A further object of the present invention is to transmit data which are adapted for certain observer positions, where again the amount of data shall be minimal. These data shall be structured such that the encoding unit is able to generate complex hologram values and/or to encode the pixel values for a holographic display device with minimal computational load. The delay between signal generation and holographic representation shall thereby be reduced as well.

The general idea of the invention defines an interface and a circuit arrangement which are required for holographic encoding units in order to be able to generate complex hologram values and/or to encode the pixel values for a holographic display device.

BRIEF DESCRIPTION OF THE DRAWINGS

FIG. 1 illustrates a third embodiment of the circuit arrangement between a graphics card and a dedicated computing unit in which the encoding unit is implemented.

DETAILED DESCRIPTION

According to this invention, the interface is characterised in that it transmits the depth map representing the depth information and, separately, the colour map representing the colour information of pixelated image data through transmission means and using communication protocols. The circuit arrangement is based on the same idea. The separate transmission is carried out spatially separated on multiple transmission means. It is also possible to use the same transmission means and to implement a separate transmission by way of time division multiplexing. In either case it is also possible to use different communication protocols.

The depth map comprises the depth information of a pixelated image. Analogously, the colour map comprises the colour information which also relates to a pixelated image. An image here is for example a single image of a video sequence. The data are retrieved for example from the memory of a graphics card, more specifically the colour maps from the so-called frame buffer and the depth maps from the Z buffer of the graphics card. Alternatively, these data are retrieved from dedicated memory devices or bus systems or from further systems whose hardware and software allows access to these data.

Various principles are employed when transmitting depth and colour information. They will be summarised briefly below.

In a first embodiment of the present invention, a standardised depth map and a standardised colour map are transmitted. These maps result for example from a specially defined view or a defined observer position. Such a particular view is for example defined such that the observer position is situated centrally and at a given distance in front of the display screen. The observer position is generally defined by the position of his eye pupils.

In a preferred embodiment, the depth maps which correspond to the position of the eye pupils of an observer are transmitted for each observer. This means that two depth maps are transmitted per observer, one for each eye. Alternatively, it is possible to only transmit the depth map which corresponds to the position of one eye pupil, particularly if the second view can be derived from that one depth map.

These embodiments are applied analogously to the colour maps.

In a preferred embodiment concerning the colour maps, the colour maps which correspond to the position of the eye pupils of an observer are transmitted for each observer. Two colour maps thus are transmitted per observer. It is also possible to only transmit the colour map which corresponds to the position of one eye pupil and to use this colour map for the second pupil accordingly, because the colour bias which typically occurs when generating the hologram values can be neglected. It is further possible to use a colour map for another observer, if the resulting colour bias can be neglected or are accepted.

Preferred versions of the data source, data receiver, transmission means and communication protocols are listed below. The data source of the interface comprises for example the memory of a graphics card or one or multiple connections of a graphics system of a PC, work station, CD player or DVD player. The data are particularly preferably provided by one or multiple data servers and are preferably transmitted through multiple parallel transmission means. Another preferred data source is provided by the PCI Express ("Peripheral Component Interconnect Express") bus, which allows a connection to the memory sections of a graphics system to be provided and the depth map and colour map to be read. Further and future bus systems which allow memory sections to be accessed and the depth maps and colour maps to be read also form possible data sources.

A communication protocol comprises for example cable, satellite, internet, WLAN, Ethernet, IEEE 802.11, Digital Visual Interface (DVI) or other suitable protocols which are available today or will be available in the future. The protocols usually comply with industrial standards or corresponding recommendations. For example, the digital visual interface (DVI) is based on the standards of the Digital Display Working Group DDWG.

According to a particularly preferred embodiment of the interface according to this invention, the data source comprises two DVI outputs so that the depth map and the colour map can be transmitted simultaneously but separately, as set forth above.

External holographic encoding units or holographic display devices which comprise an encoding unit are particularly preferably provided as data receivers. Particularly preferred encoding units will be outlined in the description of individual embodiments below. An encoding unit also comprises dedicated computing units, for example CPU, GPU or particularly designed processors. The methods used by the encoding units illustrate that a scene which is represented by the depth map reduces the required computational load of the encoding unit. While only a minimal amount of data is involved, all necessary information are provided to the encoding unit with the depth map and colour map. The view, visibility and the like have already been defined by the depth map, so that these operations do not need to be determined by the encoding unit.

The inventive interface and circuit arrangement allow image data from which video holograms can be generated to be transmitted easily and economically. The computational load for the encoding unit is thus minimised. The invention further allows systems in the field of digital video holography to be networked locally and globally.

A first preferred embodiment for one observer will be described in detail below. For this observer, for example the depth maps which correspond to the position of his pupils are transmitted from the interface to the encoding unit. This means that two depth maps are transmitted. The same applies to the colour maps. The colour maps which correspond to the position of his eye pupils are transmitted for the observer. This means that two colour maps are transmitted. The above-mentioned data are retrieved from a data server and transmitted to the encoding unit using the DVI protocol. The depth information and the colour information are transmitted separately through one DVI cable each. The same communication protocol is used here, however.

An encoding unit, which represents the data receiver, is based on the method for generating video holograms for a holographic display device, as described in document DE 10 2006 042 324, where the display device comprises at least one light modulator means on which a scene which is divided into object points is encoded as an entire hologram, and where the scene can be seen as a reconstruction from a visibility region which lies within a periodicity interval of the reconstruction of the video hologram, where the visibility region together with each object point of the scene to be reconstructed defines a sub-hologram, and where the entire hologram is formed by a superimposition of sub-holograms, and where the contributions of the sub-holograms to the entire reconstruction of the scene can be retrieved from at least one look-up table by the encoding unit for each object point of the depth map. As illustrated in the method, the computational load of the encoding unit is reduced because the depth information of the object points are directly read from the depth map which is transmitted through the interface according to this invention. With this information, the contributions of the corresponding sub-hologram can be retrieved from at least one look-up table. The entire hologram can be generated in real time.

The second preferred embodiment is described in detail below, again for one observer only in order to keep things simple. For this observer, the depth maps which correspond to the position of his eye pupils are transmitted from the interface to the encoding unit, similar to the above-mentioned example. This means that two depth maps are transmitted. However, only one colour map, which corresponds to the position of one eye pupil, is transmitted. The data are retrieved from the memory of a graphics card, more specifically the colour maps from the frame buffer and the depth maps from the Z buffer of the graphics card. Depth maps and colour maps are transmitted separately, e.g. via Ethernet. When using encoding units which determine the hologram values for the second eye pupil from the depth information of the first eye pupil, the transmission of the second depth map can be omitted. Another particularly preferred encoding unit which is based on the method for the generation of video holograms, as described in document WO/2006/066906, is provided as a data receiver. Such an encoding unit carries out the following steps aided by a computer for the scene which is represented by the depth map.

A diffraction image is computed in the form of a separate two-dimensional distribution of wave fields for an observer plane, which is situated at a finite distance and parallel to the section planes, from each object data set of each tomographic scene section, where the wave fields of all sections are computed for at least one common visibility region, The computed distributions of all section layers are added to define an aggregated wave field for the visibility region in a data set which is referenced in relation to the observer plane;

For generating a hologram data set for a common computer-generated hologram of the scene, the reference data set is transformed into a hologram plane, which is situated at a finite distance and parallel to the reference plane, where the light modulator means lies in the hologram plane.

The term 'transformation' shall be construed such as to include any mathematical or computational technique which is identical to, or which approximates, a transformation. Transformations in a mathematical sense are merely approximations of physical processes, which are described more precisely by the Maxwellian wave equations. Transformations such as Fresnel transformations, or the special group of transformations which are known as Fourier transformations, describe second-order approximations. Transformations are usually represented by algebraic and non-differential equations and can therefore be handled efficiently and at high performance using known computing means. Moreover, they can be modelled precisely using optical systems.

The above-mentioned embodiments can of course be optionally combined for multiple observers. This applies in particular to the transmission of the depth maps and colour maps, i.e. whether one or two depth maps and one or two colour maps are optionally transmitted for an observer.

FIG. 1 shows a third embodiment of the circuit arrangement between a graphics card and a dedicated computing unit in which the encoding unit is implemented. The encoding unit (HEU) implements for example one of the above-mentioned methods. The computing unit for the encoding unit (HEU) is a graphics processor (GPU). This processor can be integrated into the graphics system of a graphics card, or it can be spatially separated. They are shown separately in the FIGURE in order to keep things simple. The data source is represented by the frame buffer (FB) and the Z buffer (ZB) of a 3D rendering graphics pipeline (3D-RGP). The colour map is read from the frame buffer (FB) and the depth map is read from the Z buffer (ZB). Frame buffer and Z buffer are typically separate memories. If a common memory is used, a distinction is made between frame buffer and Z buffer by way of conventions. Lanes (L1, L2, ... ), i.e. at least one lane (L1) for the depth map and at least one lane (L2) for the colour map, are implemented as data links between data source and data receiver in order to allow the depth and colour maps to be transmitted separately, according to the present invention. If only one data link is provided, the depth maps and colour maps will be transmitted by way of time division multiplexing.

The invention claimed is:

1. An interface with at least one encoding unit,
where the interface transmits digital image data with depth information to a holographic encoding unit, where the holographic encoding unit generates from the digital image data with depth information complex hologram values and/or pixel values for controlling at least one light modulator means of a holographic display device,
where the at least one light modulator means of the holographic display device controlled by the complex hologram values and/or pixel values controls the amplitude and/or phase values of a light wave front, where the interface transmits using a transmission means and a communication protocol to the holographic encoding unit a depth map and, separately, a colour map of the image data, where the depth map comprises the depth information and where the colour map comprises the colour information of pixelated images of an image sequence, and where the interface is further configured such that the depth map is read from a Z buffer and the colour map is read from a frame buffer of a graphics card or from other dedicated memory areas of a graphics system, where the holographic encoding unit generates based on the depth map and the colour map complex hologram values, which are used to control the holographic display device in order to reconstruct an entire video hologram which represents a scene which is divided into object points, the entire video hologram can be seen from a visibility region, said visibility region lying within one periodicity interval of the reconstruction of the entire video hologram, and where the visibility region defines a sub-hologram together with each object point to be reconstructed of the scene which is represented by the depth map, and where the entire video hologram is formed by superimposition of sub-holograms.

2. An interface according to claim 1, where a specially defined observer position is situated centrally and at a given distance in front of a display screen, where the depth map is a standardised depth map for the specially defined observer position and where the colour map is a standardised colour map for the specially defined observer position.

3. An interface according to claim 1, where optionally the depth map which corresponds to the position of one eye pupil, or two depth maps which correspond to either eye pupil are transmitted for at least one observer.

4. An interface according to claim 1, where optionally the colour map which corresponds to the position of one eye pupil, or two colour maps which correspond to either eye pupil are transmitted for at least one observer.

5. An interface according to claim 1, where the following steps are carried out by the holographic encoding unit aided by a computer using the scene which is sliced into section planes and which is represented by the depth map:
 a) A diffraction image is computed in the form of a separate two-dimensional distribution of wave fields for an observer plane, which is situated at a finite distance and parallel to the section planes, from each object data set of each tomographic scene section, where the wave fields of all sections are computed for at least one common visibility region;
 b) The computed distributions of all section layers are added to define an aggregated wave field for the visibility region in a data set which is referenced in relation to the observer plane;
 c) For generating a hologram data set for a common computer-generated hologram of the scene, the reference data set is transformed into a hologram plane, which is situated at a finite distance and parallel to the reference plane, where the light modulator means lies in the hologram plane.

6. An interface according to claim 1, where the contributions of the sub-holograms to the entire reconstruction of the scene are retrieved from at least one look-up table by the holographic encoding unit for each object point of the depth map.

7. An interface according to claim 6, where the position and viewing direction of an observer defines a view of the scene which is represented by the transmitted depth map, and where the following steps are carried out by the holographic encoding unit aided by a computer for each object point of the depth map:
 d) Finding the position of the sub-hologram for each object point;
 e) Retrieval of the contributions of the corresponding sub-hologram from at least one look-up table;
 f) Repetition of the two steps d) and e) for all object points, where the sub-holograms are superimposed so as to form an entire video hologram for the reconstruction of the entire scene.

8. An interface according to claim 1, which transmits the depth maps and colour maps through one or multiple ports of a graphics system.

9. An interface according to claim 1, which transmits the depth maps and colour maps from one or multiple data servers.

10. An interface according to claim 1, where the communication protocol comprises internet, Ethernet, WLAN, IEEE 802.11 or DVI.

11. An interface according to claim 1, where the holographic display device comprises a screen means, where the screen means is either the light modulator means itself on which the video hologram of the scene is encoded, or an optical element onto which a video hologram or wave front of the scene encoded on the at least one light modulator means is imaged.

12. An interface according to claim 11, where an optical element of the holographic display device is a lens or mirror.

* * * * *